United States Patent
Yang et al.

(10) Patent No.: US 7,556,121 B2
(45) Date of Patent: Jul. 7, 2009

(54) SPEAKER SET AND MOBILE PHONE INCORPORATING THE SAME

(75) Inventors: Tsung-Lung Yang, Taipei Hsien (TW); Hsien-Sheng Pei, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 301 days.

(21) Appl. No.: 11/611,709

(22) Filed: Dec. 15, 2006

(65) Prior Publication Data
US 2008/0144879 A1    Jun. 19, 2008

(51) Int. Cl.
H05K 5/02 (2006.01)
H04R 1/28 (2006.01)
H04M 1/03 (2006.01)
H05K 5/00 (2006.01)
H04R 1/22 (2006.01)
H04M 1/02 (2006.01)

(52) U.S. Cl. ............... 181/145; 181/156; 381/349; 381/351; 379/432; 379/433.02

(58) Field of Classification Search .............. 181/148, 181/145, 156, 160; 381/335, 345, 349, 351, 381/350; 379/431, 432, 433.02
See application file for complete search history.

(56) References Cited
U.S. PATENT DOCUMENTS

| | | | | |
|---|---|---|---|---|
| 4,278,851 A * | 7/1981 | Takaya | ...................... | 340/384.6 |
| 4,549,631 A * | 10/1985 | Bose | ........................... | 181/155 |
| 5,790,679 A * | 8/1998 | Hawker et al. | .............. | 381/163 |
| 5,953,414 A * | 9/1999 | Abraham et al. | ....... | 379/433.02 |
| 6,002,949 A * | 12/1999 | Hawker et al. | ........... | 455/569.1 |
| 6,144,738 A * | 11/2000 | Hawker et al. | ......... | 379/433.02 |
| 6,321,070 B1 * | 11/2001 | Clark et al. | .............. | 455/575.1 |
| 6,389,145 B2 * | 5/2002 | Baumhauer et al. | ......... | 381/345 |
| 6,490,361 B1 * | 12/2002 | Klein | ......................... | 381/353 |
| 6,493,456 B1 * | 12/2002 | Hansson | ..................... | 381/345 |
| 6,526,150 B2 * | 2/2003 | Kelly et al. | ................. | 381/353 |
| 6,553,119 B1 * | 4/2003 | Mori | ..................... | 379/433.11 |
| 6,758,303 B2 * | 7/2004 | Zurek et al. | ................. | 181/155 |
| 6,834,744 B2 * | 12/2004 | Toki | ........................... | 181/148 |
| 6,876,743 B2 * | 4/2005 | Asahina et al. | ........ | 379/433.02 |
| 6,907,955 B2 * | 6/2005 | Masuda | ...................... | 181/148 |
| 7,346,315 B2 * | 3/2008 | Zurek et al. | ................. | 455/90.3 |
| 7,400,910 B2 * | 7/2008 | Matsumoto et al. | ......... | 455/570 |
| 2005/0168958 A1 * | 8/2005 | Finney et al. | ................ | 361/752 |
| 2005/0190941 A1 | 9/2005 | Yang | | |
| 2005/0233781 A1 * | 10/2005 | Erixon et al. | ............ | 455/575.1 |
| 2007/0154053 A1 * | 7/2007 | Yang | .......................... | 381/386 |
| 2007/0242848 A1 * | 10/2007 | Yang | .......................... | 381/386 |

* cited by examiner

*Primary Examiner*—Edgardo San Martin
(74) *Attorney, Agent, or Firm*—Frank R. Niranjan

(57) ABSTRACT

A mobile phone (1) includes a casing (10) containing a printed circuit board (28) and an antenna (29) therein; and a speaker set (20) is disposed between the printed circuit board and the antenna. The speaker set includes a hollow shell (21) including a first chamber (220), a second chamber (230) and a third chamber (240) isolated from the second chamber, and a loudspeaker (25) accommodated in first chamber of the shell and dividing the first chamber into a front chamber (224) and a rear chamber (223). The front chamber communicates with the second chamber, whilst the rear chamber communicates with the third chamber.

13 Claims, 5 Drawing Sheets

SPEAKER SET AND MOBILE PHONE INCORPORATING THE SAME

BACKGROUND OF THE INVENTION

1. Field of the Invention

The present invention relates generally to speaker sets for portable electronic devices and, more particularly, to a speaker set for a mobile phone, which gives the mobile phone compact size and good sound quality.

2. Description of Related Art

Portable electronic devices, such as notebooks, CD players, MP3s and the like, have decreased both in size and weight over the past few years and are becoming ever more popular with travelers. This demand for smaller size with ever-increasing capability has required a tremendous effort to continually shrink many of the components contained within the device.

For a notebook computer, examples of component miniaturization are hard disk storage, circuitry, tracking devices, compact disc drives, speakers, and even connectors. The reduction in the size of many of these components has not been led to any serious problems, since technological advancements have allowed improved capability along with smaller size. However, portable electronic devices being designed today require multi-media features and provide the user with the same enjoyable experience as that experienced with conventional high quality desktop systems. Thus, the sounds emanating from a portable electronic device should provide as full a harmonic content as is contained in the original sound. The production of low frequency sounds requires a large acoustic chamber for the movement of a large mass of air. As the device is reduced in size, the size of the acoustic chamber of the speaker set and the maximum power the speaker can handle are also accordingly reduced, resulting in both a reduction in loudness as well as a poorer overall quality of sound. However, increasing the device size to increase the size of the acoustic chamber for the speaker is very undesirable since it would strongly detract from the very characteristics that have helped to make these devices popular, namely their size and weight. Thus the size of the device is at odds with sound quality of the speaker.

Therefore, a portable electronic device having compact size and good sound quality is highly needed.

SUMMARY OF THE INVENTION

The present invention relates, in one respect, to a mobile phone having compact size and good sound quality, and in another aspect, to a speaker set for the mobile phone. According to a preferred embodiment of the present invention, the mobile phone includes a casing containing a printed circuit board and an antenna therein; and a speaker set is disposed between the printed circuit board and the antenna. The speaker set includes a hollow shell including a first chamber, a second chamber and a third chamber isolated from the second chamber, and a loudspeaker accommodated in first chamber of the shell and dividing the first chamber into a front chamber and a rear chamber. The front chamber communicates with the second chamber, whilst the rear chamber communicates with the third chamber.

Other advantages and novel features of the present invention will become more apparent from the following detailed description of preferred embodiment when taken in conjunction with the accompanying drawings.

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
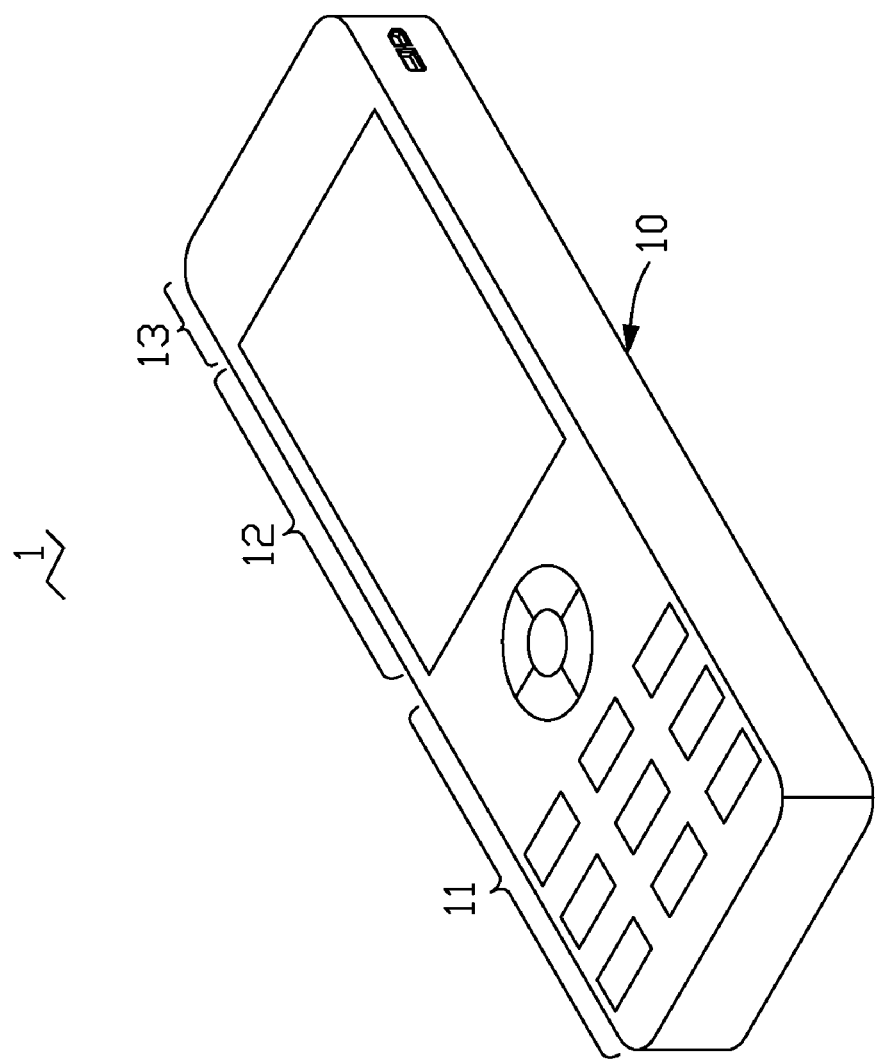
FIG. 1 is an isometric view of a mobile phone according to a preferred embodiment of the present invention.
Figure 2:
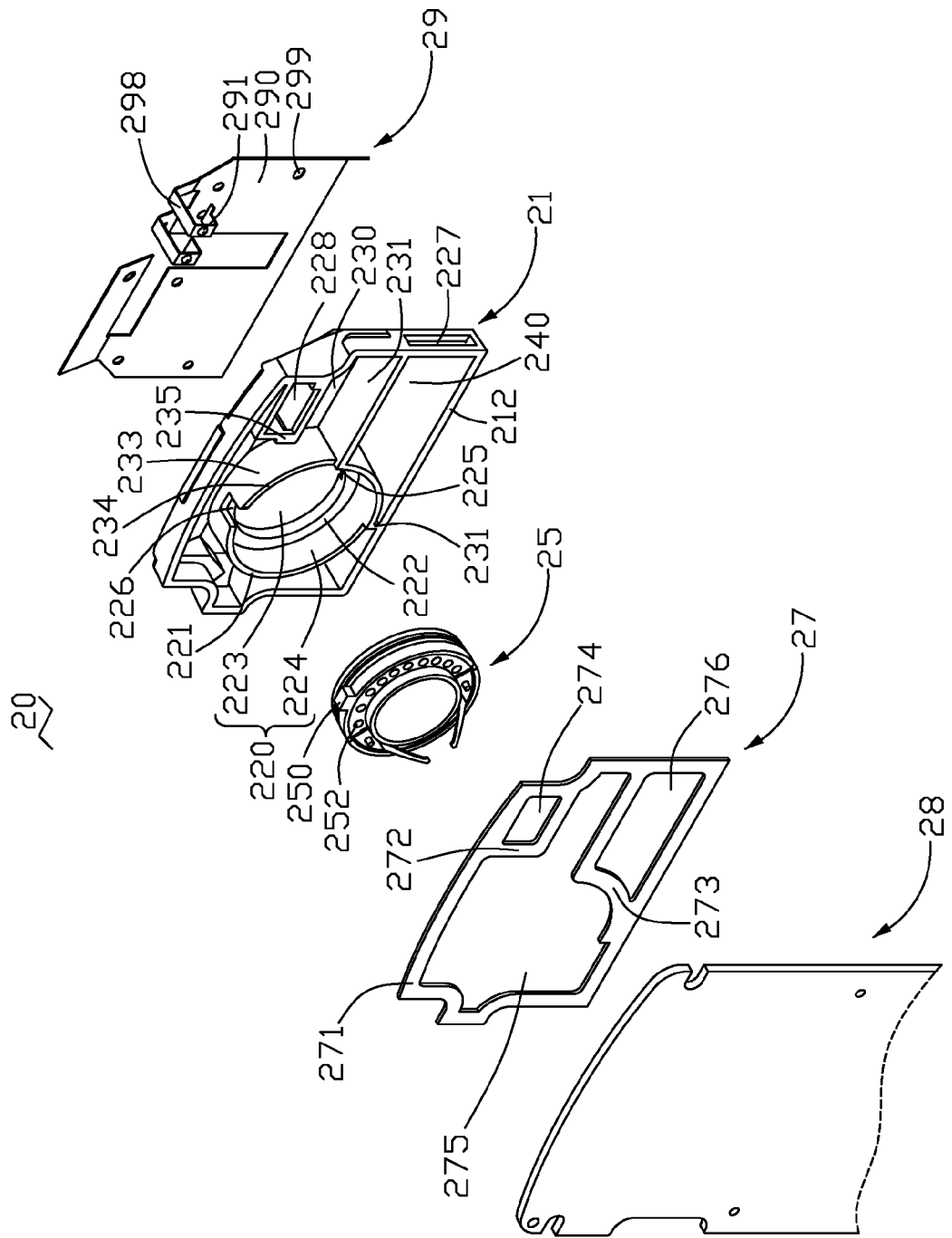
FIG. 2 is an exploded, isometric view of a speaker set and a printed circuit board and an antenna of the mobile phone of FIG. 1.
Figure 3:
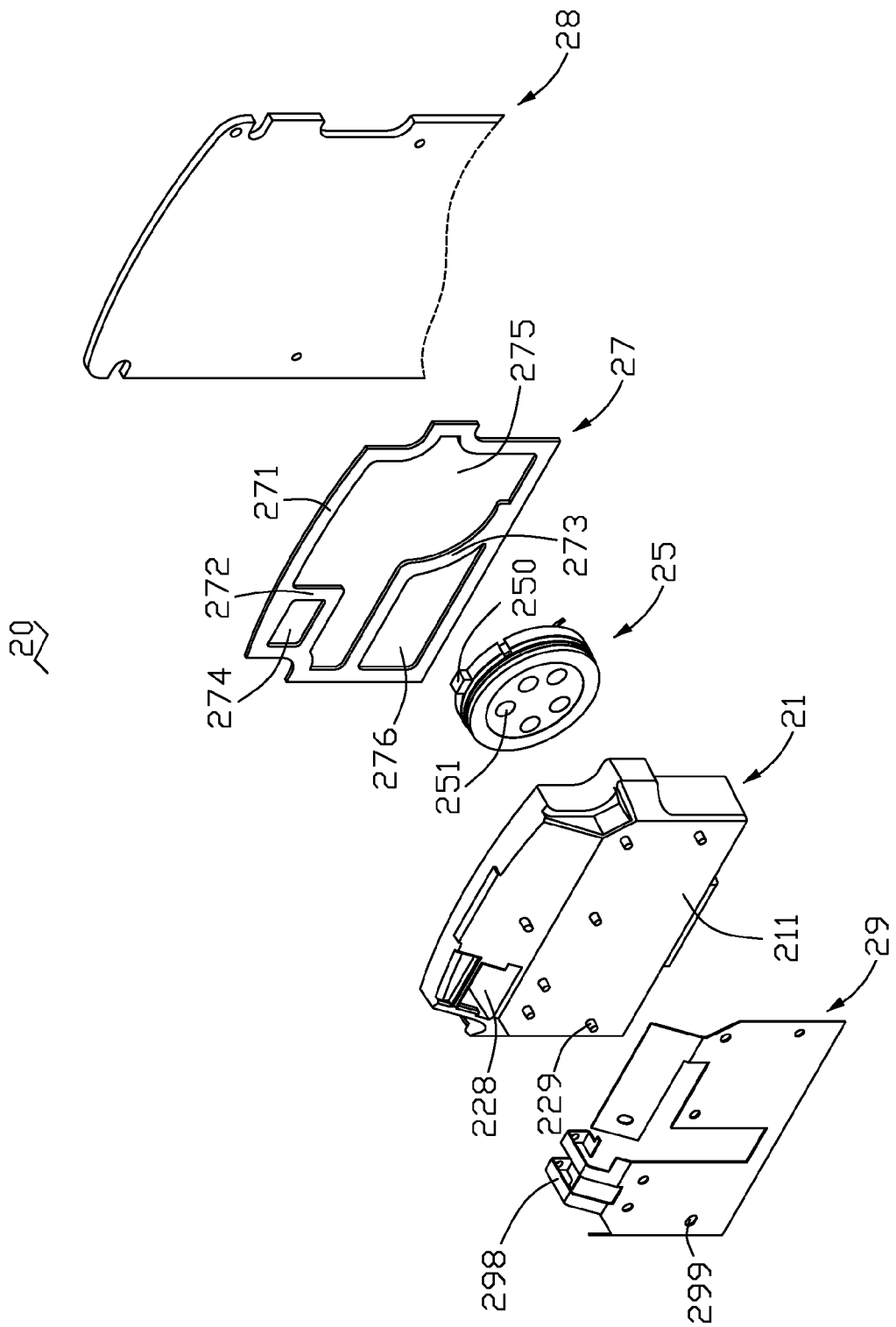
FIG. 3 is similar to FIG. 2, but viewed from another aspect thereof.
Figure 4:
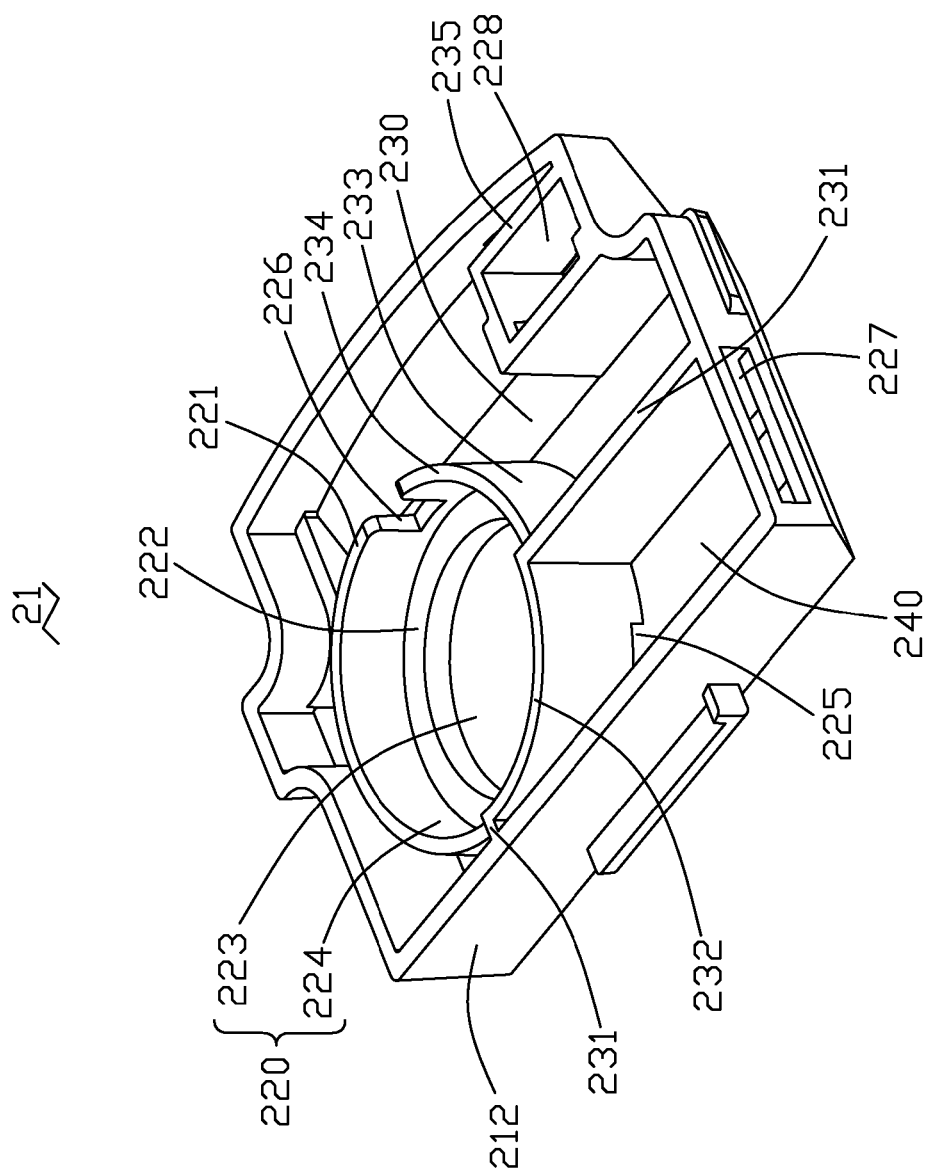
FIG. 4 is an isometric view of a shell of the speaker set of FIG. 2.
Figure 5:
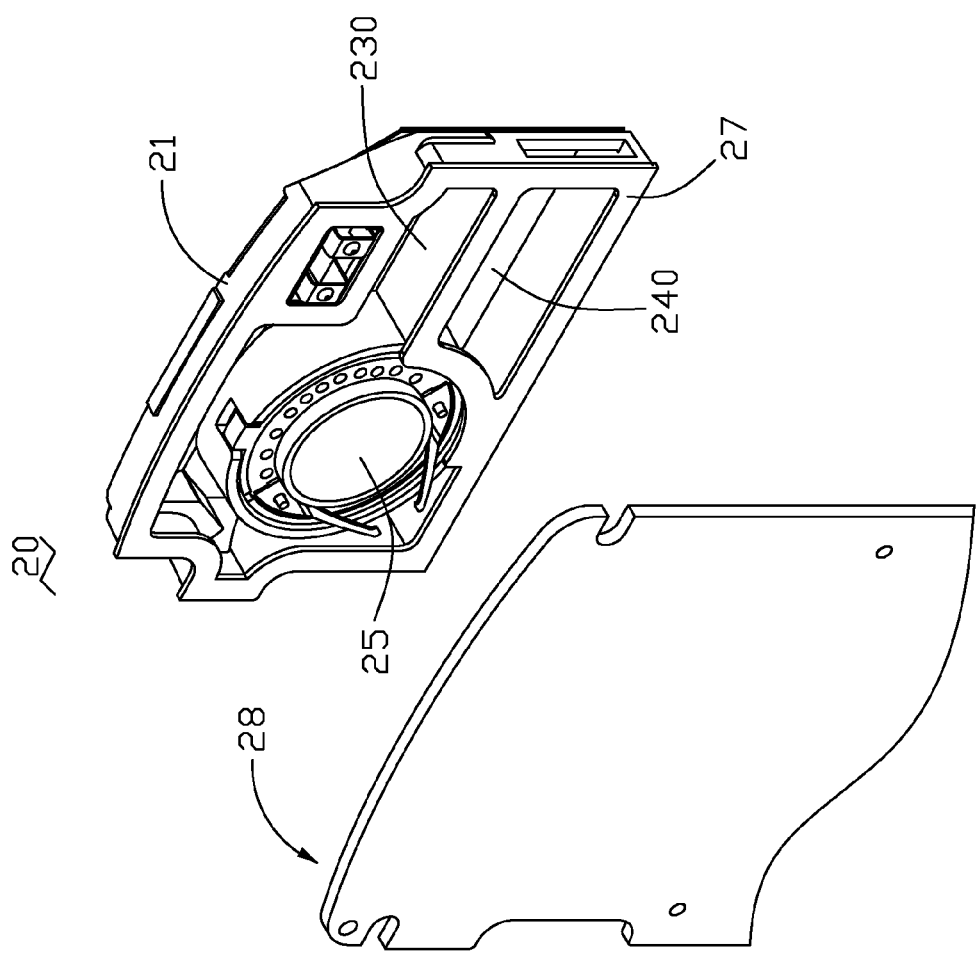
FIG. 5 is a partly assembled view of the speaker set and the printed circuit board and the antenna of FIG. 2.

Referring to FIG. 1, a mobile phone 1 according to a preferred embodiment of the present invention is shown. The mobile phone 1 includes a hollow casing 10 and a variety of elements enclosed therein. The casing 10 is substantially rectangular shaped in profile, and includes a keypad 11, a display panel 12, and a speaker section 13 respectively disposed at bottom, middle and top portions of the casing 10.

Referring to FIGS. 2 through 5, a speaker set 20 which is disposed in the speaker section 13 of the casing 10 and is sandwiched between a hidden antenna 29 of the mobile phone 1 and a printed circuit board 28 of the mobile phone 1. The printed circuit board 28 is arranged adjacent to a front side of the casing 10, whilst the antenna 29 is arranged adjacent to a rear side of the casing 10.

The antenna 29 includes a substantially rectangular shaped main plate 290 and two resilient arms 298 extending from a top and right corner thereof. A metal bulge 291 extends forwards from each of the arms 298. The main plate 290 of the antenna 29 defines a plurality of locating bores 299 therein and lays out a plurality of circuits (not shown) thereon. The circuits electrically connect the antenna 29 with the printed circuit board 28.

The speaker set 20 includes a hollow shell 21, a loudspeaker 25 accommodated in the shell 21, and a hollow frame 27 sandwiched between the shell 21 and the printed circuit board 28 of the mobile phone 1.

The shell 21 of the speaker set 20 includes a base wall 211 and a plurality of sidewalls 212 perpendicularly extending from a periphery of the base wall 211. The base wall 211 perpendicularly extends an annular wall 221 from a middle portion thereof. The annular wall 221 is separated by a predetermined distance from the sidewalls 212. The base wall 211 further extends two spacing plates 231 therefrom. The spacing plates 231 connect the annular wall 221 with the corresponding sidewalls 212. The spacing plates 231 are perpendicular to each other, and include a vertical one and a horizontal one above the vertical one. A front surface of each of the spacing plates 231 is coplanar with a front surface of each of the sidewalls 212. The spacing plates 231 and the annular wall 221 cooperatively divide a space formed between the base wall 211 and the sidewalls 212 into three sub-chambers, i.e. a first chamber 220, a second chamber 230 and a third chamber 240. Alternatively, when the annular wall 221 is disposed in contact with a bottom one of the sidewalls 212 of the shell 21, the vertical spacing plate 231 can be omitted; there are only one (i.e., the horizontal) spacing plate 231 and the annular wall 221 dividing the space formed between the base wall 211 and the sidewalls 212 into the three sub-chambers 220, 230, 240. A portion of the base wall 211 in the annular wall 221 forms a flange 222 protruding forwardly in the first chamber 220. The flange 222 is annular and contacts with an inner side of the annular wall 221. The loudspeaker 25 is mounted on the flange 222 and is accommodated in the first chamber 220 to divide the first chamber 220 into two isolated chambers, i.e., a front chamber 224 and a rear chamber 223. A front surface of a first edge portion 232 of the annular wall 221 corresponding to the third chamber 240 is coplanar with the front surface of each of the sidewalls 212. The first edge portion 232 defines a slot 225 at a bottom thereof so as to communicate the rear chamber 223 of the first chamber 220 with the third chamber 240. A front surface of a second edge portion 233 of the annular wall 221 corresponding to the second chamber 230 is lower than that of the first edge portion 232 of the annular wall 221 so that a gap 234 is formed at a top of the second edge portion 233. The gap 234 communicates the front chamber 224 of the first chamber 220 with the second chamber 230. The second edge portion 233 further defines a cutout 226 therein so as to receive an ear 250 of the loudspeaker 25 therein, preventing the loudspeaker 25 from rotating in the annular wall 221. The base wall 211 defines a rectangular shaped opening 228 therein and extends a rectangular shaped wall 235 around the rectangular shaped opening 228. A front surface of the rectangular shaped wall 235 is coplanar with the front surface of each of the sidewalls 212 of the shell 21 so as to isolate the second chamber 230 from a space surrounded by the rectangular shaped wall 235. The sidewall 212 of the shell 21 defines a vent hole 227 at the third chamber 240 so as to communicate the third chamber 240 with the surrounding environment. A rear side of the base wall 211 extends a plurality of locating pins 229 (shown in FIG. 3) therefrom. The locating pins 229 are respectively received in the locating bores 299 of the antenna 29 so as to locate the antenna 29 to the rear side of the shell 21.

The loudspeaker 25 defines a plurality of first tone holes 252 facing towards the front chamber 224 of the first chamber 220 and a plurality of second tone holes 251 (shown in FIG. 3) opposite to the first tone holes 252. The loudspeaker 25 electrically connects with the printed circuit board 28 so as to receive electrical signals from the printed circuit board 28 and convert the electric signals into acoustic signals. The acoustic signals drive a diaphragm (not shown) of the loudspeaker 25 to oscillate and generate sound waves. The sound waves are transmitted from the loudspeaker 25 via the first and second tone holes 252, 251.

The hollow frame 27 is sandwiched between the front surfaces of the sidewalls 212 of the shell 21 and a rear surface of the printed circuit board 28. The hollow frame 27 can be made of anti-vibration materials such as rubber, or glass fiber cloth. The hollow frame 27 includes an outer frame 271, and two inner frames 272, 273 disposed in the outer frame 271. The outer frame 271 has a similar periphery configuration to the periphery configuration of the shell 21 when viewed from the front. The outer frame 271 and the inner frames 272, 273 cooperatively define a first opening 275 communicating with the front chamber 224 of the first chamber 220 and the second chamber 230, a second opening 276 communicating with the rear chamber 223 of the first chamber 220 via the third chamber 240 and the slot 225, and a rectangular shaped opening 274 communicating with the space enclosed by the rectangular shaped wall 235 of the shell 21. The hollow frame 27 should preferably be designed to allow a large volume to be enclosed therein without decreasing the anti-vibration capability thereof.

In assembly of the speaker set 20 in the mobile phone 1, the printed circuit board 28 is first disposed in the casing 10 of the mobile phone 1. The loudspeaker 25 is disposed in the annular wall 221 and mounted on the flange 222. The hollow frame 27 is located on an open side (front side) of the shell 21, with the outer frame 271 and the inner frames 272, 273 contacting with the corresponding front surfaces of the sidewalls 212, of the annular wall 221, of the spacing plates 231 and of the rectangular shaped wall 235. The arms 298 of the antenna 29 extend through the rectangular shaped openings 228, 274 of the shell 21 and the hollow frame 27 in that order. Two opposite surfaces of the arms 298 respectively abut against sidewalls (not labeled) of the rectangular shaped openings 228, 274 of the shell 21 and the hollow frame 27, and the locating pins 229 are fitted into the locating bores 299 so that the antenna 29 is preassembled to the speaker set 20. The preassembled the speaker set 20 and the antenna 29 are arranged in the casing 10 of the mobile phone 1, with the bulges 291 of the arms 298 contacting the printed circuit board 28 so as to electrically connect the antenna 29 with the printed circuit board 28.

In the assembly of the speaker set 20 and the casing 10 of the mobile phone 1, the shell 21, the hollow frame 27 and the circuit board 28 are hermetically connected with each other so as to divide a space formed therebetween into two isolated Helmholtz resonance chambers, i.e., a first resonance chamber communicating with the first tone holes 252 of the loudspeaker 25, and a second resonance chamber communicating with the second tone holes 251 of the loudspeaker 25. The first resonance chamber consists of the front chamber 224 and the second chamber 230. The second resonance chamber consists of the rear chamber 233 and the third chamber 240. The sounds generated by the loudspeaker 25 are transmitted to and resonate with the first and second resonance chambers at the natural frequencies thereof. Therefore, the low-frequency sound of the loudspeaker 25 emitted from the second tone holes 251 is boosted. The boosted low-frequency sound is then transmitted to the surrounding environment via the vent hole 227 of the shell 21.

The mobile phone 1 has two resonance chambers in the casing 10, which increases the size of the resonance chamber for the loudspeaker 25 without increasing the size of the mobile phone 1. Therefore, the present mobile phone 1 has better low frequency performance than conventional mobile phones having the same size as the present mobile phone 1. When the acoustic field of the present mobile phone 1 was simulated by using SYSNOISE software distributed by LMS North America, 5455 Corporate Drive, Suite 303, Troy, Mich. 48098, it was found that the response frequency of the first resonance chamber is 2941 HZ, and the response frequency of the second resonance chamber is 3851 HZ. The response frequencies of the first and second resonance chambers are frequencies to which the ear is responsive, thus allowing high quality sounds to be made by the present mobile phone 1. Furthermore, the first and second resonance chambers are both formed at one side (the open side) of the shell 21, which further decreases the size of the mobile phone 1 as compared to a mobile phone with the first and second resonance chambers disposed at two opposite sides of the shell.

In addition, the hollow frame 27 weakens the vibration caused by the sound waves transferring towards the printed circuit board 28, which prevents the quality of the sound from being impaired by the vibration. The hollow frame 27 has hermetic seal with the printed circuit board 28 and the shell 21 of the speaker set 20, which prevents the sounds from leakage from interstices formed between the printed circuit board 28 and the shell 21 of the speaker set 20. The first and second resonance chambers are isolated from each other. This prevents the sounds in the first and second resonance chambers of the speaker set 20 from interfering with each other in the casing 10 of the mobile phone 1 and thus improves the quality of the sound made by the mobile phone 1.

The present speaker set 20 is disposed in a mobile phone 1. Alternatively, the speaker set 20 is capable of being used in other kinds of portable electronic devices, such as personal digital assistants (PDAs), CD players, MP3s and MP4s. The speaker set 20 is positioned in the space formed between the antenna 29 and the printed circuit board 28 so as to save space in the mobile phone 1. In addition, the hollow frame 27 prevents the quality of the sound from being impaired by the vibration between the loudspeaker 25 and the printed circuit board 28. Consequently, the mobile phone 1 is compact as well as having good sound quality.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

What is claimed is:

1. A speaker set configured for an electronic product comprising:
    a hollow shell comprising a first chamber, a second chamber and a third chamber isolated from the second chamber;
    a loudspeaker accommodated in the first chamber of the shell, dividing the first chamber into a front chamber and a rear chamber, the rear chamber communicating with the third chamber, and the front chamber communicating with the second chamber, the loudspeaker having first tone holes communicating with the front chamber and second tone holes communicating with the rear chamber, the third chamber communicating with a surrounding environment so that sound emitted from the second tone holes of the speaker can be transferred to the surrounding environment; and
    a hollow frame for being sandwiched between an open side of the shell and a printed circuit board of the electronic product so as to form a first resonance chamber consisting of the front chamber and the second chamber and a second resonance chamber isolated from the first resonance chamber and consisting of the rear chamber and the third chamber;
    wherein the shell comprises a base wall and a plurality of sidewalls surrounding the base wall, the first chamber being enclosed by an annular wall extending from the base wall, the second and third chambers being formed between the base wall, the sidewalls and a periphery of the annular wall, and being isolated from each other by at least a spacing plate disposed between the annular wall and a corresponding sidewall.

2. The speaker set as described in claim 1, wherein the frame is made of anti-vibration materials.

3. The speaker set as described in claim 2, wherein the frame is made of rubber, or glass fiber cloth.

4. The speaker set as described in claim 1, wherein the annular wall comprises a first edge portion disposed corresponding to the third chamber and a second edge portion disposed corresponding to the second chamber, the third chamber communicating with the rear chamber of the first chamber via a slot defined at a bottom of the first edge portion, the second chamber communicating with the front chamber of the first chamber via a gap defined at a top of the second edge portion.

5. The speaker set as described in claim 4, wherein the frame defines a first opening communicating with the front chamber of the first chamber and the second chamber so as to form the first resonance chamber, and a second opening communicating with the rear chamber of the first chamber and the third chamber so as to form the second resonance chamber.

6. A mobile phone comprising:
    a casing containing a printed circuit board and an antenna therein; and
    a speaker set sandwiched between the printed circuit board and the antenna and comprising a hollow shell comprising a first chamber, a second chamber and a third chamber isolated from the second chamber, and a loudspeaker accommodated in first chamber of the shell and dividing the first chamber into a front chamber and a rear chamber, the front chamber communicating with the second chamber, and the rear chamber communicating with the third chamber;
    wherein the shell comprises a base wall and a plurality of sidewalls surrounding the base wall, the first chamber being enclosed by an annular wall extending from the base wall, the second and third chambers being formed between the base wall, the sidewalls and a periphery of the annular wall and being isolated from each other by at least a spacing plate disposed between the annular wall and a corresponding sidewall.

7. The mobile phone as claimed in claim 6, wherein the shell further comprises a flange disposed at a bottom of the annular wall in the first chamber, the loudspeaker being mounted on the flange and dividing the first chamber into the front and rear chambers.

8. The mobile phone as claimed in claim 6, wherein the annular wall comprises a first edge portion disposed corresponding to the third chamber and a second edge portion disposed corresponding to the second chamber, the third chamber communicating with the rear chamber of the first chamber via a slot defined at a bottom of the first edge portion, the second chamber communicating with the front chamber of the first chamber via a gap defined at a top of the second edge portion.

9. The mobile phone as claimed in claim 8, further comprising a hollow frame sandwiched between an open side of the shell and a printed circuit board of the electronic product so as to form a first resonance chamber and a second resonance chamber isolating from the first resonance chamber.

10. The mobile phone as claimed in claim 9, wherein the frame defines a first opening communicating with the front chamber of the first chamber and the second chamber so as to form the first resonance chamber, and a second opening communicating with the rear chamber of the first chamber and the third chamber so as to form the second resonance chamber.

11. The mobile phone as claimed in claim 9, wherein the frame is made of anti-vibration materials selected from one of rubber and glass fiber cloth.

12. The mobile phone as claimed in claim 6, wherein the third chamber communicates with a surrounding environment via a vent hole defined in one of the sidewalls of the shell.

13. The mobile phone as claimed in claim 12, wherein the speaker has first tone holes communicating with the front chamber of the first chamber and second tone holes communicating with the rear chamber of the first chamber, sound generated by the speaker and emitted from the second tone holes of the speaker being transmitted to the surrounding environment via the rear chamber of the first chamber, the third chamber and the vent hole.

* * * * *